United States Patent [19]

Kuphal et al.

[11] Patent Number: 4,940,733
[45] Date of Patent: Jul. 10, 1990

[54] METHOD FOR FOAMING HIGH TEMPERATURE POLYMERS USING POLY(ALKYLENE CARBONATES) AS FOAMING AGENTS

[75] Inventors: Jeffrey A. Kuphal, Blandon; Lloyd M. Robeson, Macungie; Joseph G. Santangelo, Allentown, all of Pa.

[73] Assignee: Air Products and Chemicals, Inc., Allentown, Pa.

[21] Appl. No.: 442,107

[22] Filed: Nov. 28, 1989

[51] Int. Cl.$^5$ .............................. C08J 9/08; C08J 9/02
[52] U.S. Cl. ....................................... 521/79; 521/77; 521/81; 521/138; 521/180; 521/183; 521/189
[58] Field of Search ................... 521/79, 81, 138, 180, 521/189, 183, 77

[56] References Cited

U.S. PATENT DOCUMENTS

| | | | |
|---|---|---|---|
| 3,222,302 | 12/1965 | Böllert et al. | 521/77 |
| 3,277,029 | 10/1966 | Chadwick et al. | 521/97 |
| 3,290,261 | 12/1966 | Goldblum | 521/180 |
| 3,470,114 | 9/1969 | Siggel et al. | 521/138 |
| 3,585,168 | 6/1971 | Inoue et al. | 260/77.5 D |
| 3,953,383 | 4/1976 | Inoue et al. | 260/2 BP |
| 4,633,929 | 1/1987 | Santangelo et al. | 164/34 |
| 4,743,630 | 5/1988 | Darnell et al. | 521/180 |
| 4,874,030 | 10/1989 | Kuphal | 521/180 |

Primary Examiner—Morton Foelak
Attorney, Agent, or Firm—Keith D. Gourley; James C. Simmons; Wlliam F. Marsh

[57] ABSTRACT

A process for producing cellular foamed articles from high temperature engineering polymers wherein polymeric blowing agents are utilized to expand the polymers. The process comprises mixing a first polymer capable of being foamed with a second polymer comprising at least one poly(alkylene carbonate) to provide a polymer blend; heating the polymer blend to a temperature sufficient to melt the polymer to be foamed and to decompose the second polymer to form gas inclusions within the first polymer; expanding the melted first polymer containing the gas inclusions to form a foamed article; and cooling the foamed article to a temperature below the melting or softening point of the foamed article. Polymers which may be foamed according to the process include those polymers which can tolerate processing temperatures in excess of 260° C. Suitable poly(alkylene carbonate) foaming agents include poly(propylene carbonate), blends of two or more poly(alkylene carbonates) and copolymers and terpolymers formed by polymerizing two or more oxirane compounds in the presence of carbon dioxide.

20 Claims, No Drawings

4,940,733

METHOD FOR FOAMING HIGH TEMPERATURE POLYMERS USING POLY(ALKYLENE CARBONATES) AS FOAMING AGENTS

TECHNICAL FIELD OF THE INVENTION

The present invention relates to the production of cellular foamed articles wherein poly(alkylene carbonates) are utilized as blowing agents to expand high temperature polymers.

BACKGROUND OF THE INVENTION

Foamed thermoplastic materials are used in many applications including, but not limited to, cushioning and packaging materials, insulation, foamed extruded profiles and injection molded structural foam. Foamed thermoplastic materials offer numerous advantages over other structural materials including thermal and sound insulation, reduced weight per unit volume and low cost per unit volume.

Various methods are known for producing cellular thermoplastic articles which are generally referred to as "foam" or "foamed thermoplastic" articles. Foaming is typically accomplished by injecting an inert gas such as nitrogen or carbon dioxide under high pressure into a molten polymer followed by a release of pressure to expand and create the foamed article. Addition of volatile liquids such as chloro-fluorocarbons and pentane are commonly employed to foam specific polymers including polystyrene and various polyurethanes.

Another group of blowing agents, typically referred to as chemical blowing agents, decompose upon heating to generate gas which is utilized to expand the polymer. Chemical blowing agents are commonly employed in the extrusion of profiles and foam injection molding of automotive parts. Chemical blowing agents utilized for foaming polymers include both inorganic materials (e.g., sodium bicarbonate and sodium borohydride) and organic materials (e.g., azodicarbonamide, tetrazoles and semi-carbazides). Azodicarbonamide, which decomposes in the range of 400° to 450° C., is a commonly used chemical blowing agent which generates nitrogen and carbon monoxide upon decomposition. P-toluenesulfonyl semi-carbazide and 5-phenyltetrazole, having decomposition temperatures ranging from 440°–450° F. and 460°–500° F., respectively, are utilized in the foaming of various high temperature engineering polymers. Variants of 5-phenyltetrazole are stated to be useful as foaming agents in processes wherein processing temperatures approach 750° F. Further information on foaming agents is provided in *Modern Plastics Encyclopedia* (R.L. Heck. III p. 146. 1985).

In the foaming of molten thermoplastic resins, volatilizable blowing agents form bubbles around nuclei within the molten polymer resin. While a certain number of nuclei are inherently present within the molten polymer, additional nucleating agents may by added to facilitate the production of fine-celled foams. Examples of materials employed as nucleating agents include surfactants, gas-liberating thermally decomposable solids, non-decomposable inorganic solids and materials which provide hot spots such as particulate inorganic solids (e.g., talc).

In the production of cellular thermoplastic articles wherein a molten thermoplastic resin is expanded utilizing a dissolved volatilizable blowing agent, bubble formation takes place in the melt as the pressure on the melt is reduced. Typically, such a pressure drop takes place as the dissolved foaming agent within the melt, residing at a higher temperature and pressure, passes through a die or orifice to the outside of the die or orifice which typically resides at ambient pressure and temperature. The dissolved foaming agent diffuses into the bubble as a bubble is initiated at a nucleating site. Bubble formation is facilitated by the presence of an effective amount of nucleation sites. If such sites are present bubbles will be formed when the driving force is relatively low whereas high driving forces are required when nucleation sites are relatively few in number.

BRIEF SUMMARY OF THE INVENTION

The present invention relates to a process for producing cellular foamed articles from high temperature engineering polymers wherein polymeric foaming agents are utilized to expand the polymers. The process comprises mixing a first polymer capable of being foamed with a second polymer comprising at least one poly(alkylene carbonate) to provide a polymer blend; heating the polymer blend to a temperature sufficient to melt the polymer to be foamed and to decompose the second polymer to form gas inclusions within the first polymer; expanding the melted first polymer containing the gas inclusions to form a foamed article; and cooling the foamed article to a temperature below the melting or softening point of the foamed article.

The polymers capable of being foamed by utilizing the polymeric foaming agents according to the present process include both amorphous and semi-crystalline polymers which can tolerate processing temperatures in excess of about 260° C., and include polysulfone, poly(ether sulfone), poly(aryl sulfone), poly(aryl ether sulfone), poly(etherimide), poly(amide-imide), poly(aryl ether ketone), modified poly(phenylene ether), amorphous polyamides and poly(phenylene sulfide).

The polymeric foaming agents comprise at least one poly(alkylene carbonate) represented by the formulae:

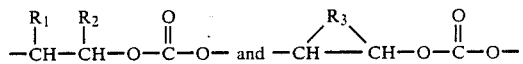

wherein $R_1$ is a hydrogen atom or a linear or branched alkyl group having from about 1 to six carbon atoms; $R_2$ is selected from H or $CH_3$; and $R_3$ is an alkylene group having from about 2 to 6 carbons atoms which may optionally contain an oxygen atom or a sulfur atom in the alkylene backbone.

The poly(alkylene carbonate) foaming agents include blends of two or more specific poly(alkylene carbonates) and copolymers and terpolymers prepared by methods known in the art including reacting carbon dioxide with two or more oxirane compounds.

The process according to the present invention provides significant advantages over processes known in the art for foaming polymers. For example, the degradation of poly(alkylene carbonates) proceeds through a liquid stage which provides improved disperion of the foaming agent into the polymer to be foamed. The density of poly(alkylene carbonates) is similar to the density of the polymers to be foamed, thus limiting polymer segregation during the process prior to melt mixing. Moreover, poly(alkylene carbonates) decompose cleanly leaving essentially no residue in the foamed article. Other advantages will be apparent upon reading the Detailed Description of the Invention.

DETAILED DESCRIPTION OF THE INVENTION

The present invention relates to a process for producing cellular foamed articles from high temperature engineering polymers which utilizes polymeric foaming agents comprising one or more poly(alkylene carbonates). The use of polymeric foaming agents represents a significant advance in the art and offers numerous advantages over conventional foaming agents. For example, while powdered foaming agents tend to separate from the polymer pellets prior to melt processing and liquid foaming agents typically require a dispensing procedure such as pumping into the molten polymer, the polymeric foaming agents of the present invention can be mixed in granular or pellet form with the polymer to be foamed and stored conveniently prior to being introduced into the extruder or injection molding machine.

The use of poly(alkylene carbonates) for forming cellular foamed articles also allows facile foam formation without degradation of the polymer to be foamed. Moreover, the degradation products of the poly(alkylene carbonates) of the present invention are believed to be low in toxicity and corrosivity which are critical parameters in many applications. Thus, the process of the present invention which utilizes the polymeric foaming agents disclosed herein offers numerous advantages over conventional non-polymeric liquid and gaseous foaming agents.

The process according to the present invention comprises mixing a first polymer capable of being foamed with a second polymer comprising one or more poly(alkylene carbonates) to provide a polymer blend; heating the polymer blend to a temperature sufficient to melt the polymer to be foamed and to decompose the second polymer to form gas inclusions within the first polymer; expanding the melted first polymer containing the gas inclusions to form a foamed article; and cooling the foamed article to a temperature below the melting or softening point of the foamed article.

Polymers capable of being foamed include both amorphous and semi-crystalline polymers which can tolerate processing temperatures in excess of 260° C., and preferably in excess of 300° C. Such polymers include polysulfone, poly(ether sulfone), poly(aryl sulfone), poly(aryl ether sulfone), poly(etherimide), poly(amide-imide), poly(aryl ether ketone), modified poly(phenylene ethers) (e.g., mixtures of poly(2,6-dimethyl-1,4- phenylene oxide) and polystyrene). amorphous polyamides, poly(phenylene sulfide), and the like. Moreover, the polymers capable of being foamed include copolymers and terpolymers as well as blends of the above-mentioned polymers. The polymers capable of being foamed as listed herein are illustrative and are not meant to limit the scope of the present invention. Essentially any polymer which has properties commensurate with those disclosed in this Specification can be foamed according to the present process.

The polymeric foaming agents of the present process comprise one or more covalently linked units represented by the formulae:

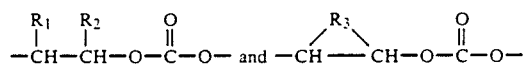

wherein $R_1$ is a hydrogen atom or linear or branched alkyl group having from about 1 to six carbon atoms. More particularly, $R_1$ is selected from a primary secondary or tertiary alkyl group including methyl, ethyl, propyl, isopropyl, butyl, isobutyl, tert-butyl and the isomers of pentyl and hexyl; $R_2$ is selected from H or $CH_3$; and $R_3$ is an alkylene group having from about 2 to 6 carbons atoms which may optionally contain an oxygen atom or a sulfur atom in the alkylene backbone. For example, $R_3$ may be $C_2H_4$, $C_5H_{10}$, $C_6H_{12}$, $C_4H_8O$ and $C_4H_8S$. The average molecular weight of the poly(alkylene carbonates) of the present invention typically ranges from about 1,000 to 1,000,000.

Poly(alkylene carbonates) of the present invention are prepared using methods known in the art including the methods disclosed in U.S. Pat. Nos. 3.585,168, 3,953,383 and 4.633,929, the Specifications which are incorporated by reference herein, wherein carbon dioxide is polymerized with one or more oxirane compounds. The oxirane compounds contemplated by the present invention are represented by the formulae:

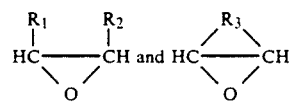

wherein $R_1$ is a hydrogen atom or linear or branched alkyl group having from about 1 to six carbon atoms. More particularly, $R_1$ is selected from a primary, secondary or tertiary alkyl group including methyl, ethyl, propyl, isopropyl, butyl, isobutyl, tert-butyl and the isomers of pentyl and hexyl; $R_2$ is selected from H or $CH_3$ $R_3$ is an alkylene group having from about 2 to 6 carbons atoms which may optionally contain an oxygen atom or a sulfur atom in the alkylene backbone. For example, $R_3$ may be $C_2H_4$, $C_5H_{10}$, $C_6H_{12}$, $C_4H_8O$ and $C_4H_8S$.

In a preferred embodiment, poly(propylene carbonate) is utilized as the polymeric foaming agent. Poly(propylene carbonate) may also contain units of propylene oxide. Poly(propylene carbonate) is represented by the formula:

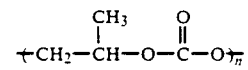

A detailed discussion concerning the preparation of poly(propylene carbonate) is given by Inoue and Yamazaki in "Synthesis of Macromolecules from Carbon Dioxide" in Organic and Bio-Organic Chemistry of Carbon Dioxide, Chapter 4, John Wiley and Sons, (New York, 1982). Poly(propylene carbonate) particularly suited for use in the present invention has an average molecular weight of at least about 1000 with an upper limit of about 1,000,000. When the molecular weight of the poly(alkylene carbonate) foaming agent exceeds 1,000,000, the viscosity of the foaming agent is believed to rise to the extent wherein the foaming agent cannot properly disperse into the polymer to be foamed.

In an equally preferred embodiment, blends of poly(alkylene carbonates can be utilized as the foaming agent. For example, poly(propylene carbonate) may be blended with any of the poly(alkylene carbonates) defined herein including poly(ethylene carbonate), poly(butylene carbonate) and poly(cyclohexene) carbonate. Moreover poly(alkylene carbonate) copolymers and terpolymers can be prepared by utilizing two or more of the oxirane compounds previously defined in this Specification. For example, propylene oxide and 4-butene-1-oxide can be polymerized in the presence of carbon dioxide to form a poly(alkylene carbonate) copolymer.

The polymeric foaming agents of the present invention may additionally contain various additives, coloring agents and the like. For example, nucleating agents can be added to the polymer to be foamed or introduced into the blend of polymer to be foamed and polymeric foaming agent prior to processing. Suitable nucleating agents include inorganic fillers such as talc, wollastonite, attapulgus clay, kaolin clay, calcium carbonate and the like as well as organic substances such as citric acid. Activators can also be added to increase the gas yield at lower processing temperatures. These may include zinc oxide, acids, gases, peroxides, other foaming agents, and zinc-, barium- or cadmium- based vinyl stabilizers.

The amount of foaming agent to be used in the present process depends on the desired expansion ratio and the particular polymer contemplated for foaming. Generally, the amount of foaming agents to be utilized ranges from about 1 to about 15 wt% based upon the total weight of polymer to be foamed. The particular amount of foaming agent to be used is easily determined by those skilled in the art and should be that amount sufficient to produce the desired expansion ratio. In the event that the desired expansion ratio cannot be obtained due to limitations imposed by the particular system (i.e., if the allowable processing temperature range limits the expansion rate) then physical and chemical foaming agents can be used in conjunction with the poly(alkylene carbonates) of the present invention. Suitable conventional foaming agents include trichlorofluoromethane, butane, azodicarbonamide, azobisisobutyronitrile, dinitrosopentamethylenetetramine and the like.

In the process according to the present invention, the particular polymer to be foamed, one or more poly(alkylene carbonates) and desired additives are mixed to provide a polymer blend. Such mixing can be effected by conventional means including the mixing zone of commercial extruders, injection molding machines and the like wherein the temperature within such mixing zone is sufficient to soften or melt the polymer to be foamed and the poly(alkylene carbonate) foaming agent to effect a homogeneous dispersion of the foaming agent into the polymer to be foamed.

The next step of the process comprises heating the polymer blend to a temperature sufficient to melt the polymer to be foamed and to decompose the poly(alkylene carbonate) foaming agent to form gas inclusions within the polymer to be foamed. The particular temperature to be utilized will depend upon the melting or softening temperature of the polymer blend. The melting temperature of the polymer to be foamed and the decomposition temperature of the poly(alkylene carbonate) are easily determined by those skilled in the art.

The decomposition profile of poly(alkylene carbonates) introduces tremendous flexibility to the process of the present invention. For example, while poly(propylene carbonate) begins to degrade at about 200° C., (as judged by thermogravimetric analysis) the initial degradation yields propylene carbonate which has low volatility. Propylene carbonate is believed to either decompose further to generate sufficient gas volume at temperatures above 300° C., or yield foaming due to higher volatility at higher temperatures. The degradation of poly(propylene carbonate) proceeds through a liquid stage forming propylene carbonate at temperatures greater than about 200° C. The transition from a melted solid to the liquid phase is believed to provide improved dispersion of the foaming agent into the polymer to be foamed.

The next step in the process comprises expanding the melted polymer containing the gas inclusions to form a foamed article. The expanding is effected by creating a pressure drop across an orifice or die of the apparatus being utilized to practice the present process. For example such a pressure drop occurs when the dissolved poly(alkylene carbonate) foaming agent within the polymer to be foamed, which resides at a higher temperature and pressure. passes through a die or orifice to the outside of the die or orifice which typically resides at ambient pressure and temperature.

The driving force for expansion is the pressure difference between the higher pressure within the apparatus and the lower ambient pressure wherein such a pressure difference allows the polymeric foaming agent to expand thereby forming gas inclusions within the melted polymer to be foamed. The expansion according to the present invention can be effected by utilizing apparatus and methods known in the art including but not limited to extrusion, injection molding, compression molding and the like.

The final step in the process comprises cooling the foamed article to a temperature below the melting or softening temperature of the foamed article. The melting or softening temperature of the polymer is that temperature at which the polymer to be foamed can be elongated by expansion forces produced by the foaming agent to an extent wherein a foamed article having a practically usable expansion ratio can be obtained. The foamed article can then be remove from the apparatus and is ready for use.

The following examples illustrate the nature of the process described herein and are not intended to limit the scope of the claimed invention. Unless otherwise stated. parts and percentages in the examples are given by weight.

EXAMPLE 1

Preparation of Polysulfone Foam

UDEL P-1700 polysulfone pellets purchased from Amoco Performance Products, Inc., Ridgefield, Conn., (having an inherent viscosity of 0.44 dl/g as measured in chloroform at 25° C.) was dry blended according to the ratios described in Table 1 with pellets of poly(propylene carbonate) having a melt flow of 4.80 dg/min at 160° C/44 psi. The dry blend was melt processed in a Killion extruder (1 inch diameter, L/D=30:1) at an essentially uniform rate of approximately 2 lbs./hr. utilizing a processing temperature of about 320° C. The resultant foamed polysulfone exhibited the toughness and ductility of the pre-processed resin.

EXAMPLE 2

Preparation of Polysulfone Foam

UDEL P-1700 polysulfone pellets and poly(propylene carbonate) pellets (as described in Example 1) were dry blended according to the ratio described in Table 1.

The mixture was then injection molded into ASTM test bars using a 1.7 ounce Newbury Industries, reciprocating screw injection molding machine. The parameters used in injection molding the mixed pellets were as follows: 330° C. at the nozzle; 340° C. at the front and middle zones; 320° C. at the rear zone; overall cycle time was 30 seconds; overall injection time was 8 seconds; and initial injection time was 5 seconds. The initial injection pressure was 1500 psi; secondary injection pressure was 1000 psi; screw speed was 50–100 rpm; and the mold temperature was 80° C. The molded bars were foamed and exhibited the toughness and ductility of the pre-processed resin.

EXAMPLE 3

Preparation of Polyetherimide Foam

ULTEM 1000 polyetherimide pellets obtained from General Electric Inc., Pittsfiêld, Mass., (having an inherent viscosity of 0.32 dl/g as measured in methylene chloride at 25° C.) were dry blended according to the ratios listed in Table 1 with pellets of poly(propylene carbonate) as described in Example 1. The dry blend was melt processed in a Killion extruder (1 inch diameter, L/D =30:1) at an essentially uniform rate of approximately 2 lbs./hr., utilizing a processing temperature of 340° C. The resultant foamed polyetherimide also exhibited the toughness and ductility of the pre-processed resin.

EXAMPLE 4

Preparation of Poly(Phenylene Ether/Polystyrene Foam

Noryl N-190 pellets, a poly(phenylene ether)/polystyrene blend, obtained from General Electric Co., Pittsfield, Mass., were dry blended according to the ratios described in Table 1 with pellets of poly(propylene carbonate) described in Example 1. The dry blends were melt processed in a Killion extruder (1 inch diameter, L/D=30:1) at an essentially uniform rate of approximately 2 lbs./hr., utilizing a processing temperature of 310° C. The resultant based poly(phenylene ether)/polystyrene blend exhibited the toughness and ductility of the pre-processed resin.

EXAMPLE 5

Preparation of Polysulfone Foam

In a procedure similar to Example 1, UDEL P-1700 polysulfone pellets were dry blended according to the ratios provided in Table 1 with pellets of a 70/30 wt% copolymer of cyclohexene carbonate and propylene carbonate prepared according to the method described in U.S. Pat. No. 4,633,929. The dry blend was melt processed in a Killion extruder (1 inch diameter, L/D=30:1) at an essentially uniform rate of approximately 2 lbs./hr. utilizing a processing temperature of 340° C. The resultant foamed polysulfone exhibited the toughness and ductility of the pre-processed resin.

EXAMPLE 6

Pyrolysis of Poly(Propylene Carbonate)

Approximately 20 mg of poly(propylene carbonate) was pyrolyzed in a helium atmosphere and oxidized in an air atmosphere at 300° C. and 350° C., respectively, for 2 minutes. Pyrolyzates and oxidation products were cryofocused (liquid nitrogen trap) on a capillary column during each gas chromatography/mass spectroscopy(GC/MS) analysis. Five minutes after pyrolysis and oxidations were completed and the pyrochamber was heated to 100° C. the liquid nitrogen trap was removed and the GC/MS analyses were performed. Products were identified by GC/MS utilizing electron ionization. Emphasis was placed on determining the concentration of propylene oxide generated during decomposition at the above-described conditions. The results are summarized in Table 3.

Table 1 discloses the density of the formed materials prepared according to Examples 1 through 4. The densities of the pre-foamed resin are also provided. The data illustrate that poly(alkylene carbonates) are effective foaming agents for a broad range of polymers. For example, runs 2, 3, 6, 7, 9 and 10 illustrate that poly(propylene carbonate) is an effective foaming agent for preparing foamed polysulfones, polyetherimides and poly(phenylene ether)/polystyrene blends. An advantage of the polymeric foaming agents of the present invention resides in the exceptionally controlled decomposition of the foaming agent at the onset of decomposition. Unlike other gas evolving foaming agents which exhibit a sharp loss in weight at the initial stages of decomposition, the foaming agents of the present invention exhibit a gradual loss in weight over a much broader temperature range. Moreover, foamed articles made according to the present process wherein poly(alkylene carbonate) foaming agents are utilized contain essentially no residue. This advantage is demonstrated in Example 6.

TABLE 1

DENSITY OF FOAMED POLYMERS OBTAINED USING POLY(ALKYLENE CARBONATES)

| Run | Example | Polymer | Wt/% | Density (g/cc) |
|---|---|---|---|---|
| 1 | 1-1 | Polysulfone | 100 | 1.17 |
| 2 | 1-2 | Polysulfone | 98 | 0.72(0.70) |
|   |   | Poly(propylene carbonate) | 2 |   |
| 3 | 1-3 | Polysulfone | 96 | 0.6(0.64) |
|   |   | Poly(propylene carbonate) | 4 |   |
| 4 | 2-1 | Polysulfone | 96 | 0.81* |
|   |   | Poly(propylene carbonate) | 4 |   |
| 5 | 3-1 | Polyetherimide | 100 | 1.26 |
| 6 | 3-2 | Polyetherimide | 98 | 0.56(0.60) |
|   |   | Poly(propylene carbonate) | 2 |   |
| 7 | 3-3 | Polyetherimide | 96 | 0.56(0.55) |
|   |   | Poly(propylene carbonate) | 4 |   |
| 8 | 4-1 | Poly(phenylene ether) polystyrene | 100 | 1.04 |
| 9 | 4-2 | Poly(phenylene ether)/ polystyrene | 98 | 0.71(0.70) |
|   |   | Poly(propylene carbonate) | 2 |   |
| 10 | 4-3 | Poly(phenylene ether/ polystyrene | 96 | 0.69(0.70) |
|   |   | Poly(propylene carbonate) | 4 |   |
| 11 | 5-1 | Poly(sulfone) | 98 | 0.68(0.71) |
|   |   | Cyclohexene carbonate/ propylene carbonate 70/30 | 2 |   |
| 12 | 5-2 | Poly(sulfone) | 96 | 0.60(0.62) |
|   |   | Cyclohexene carbonate/ propylene carbonate 70/30 | 4 |   |

( ) Brackets indicate measurements on entire stand
Unbracketed measurements taken on pellets
*Sample prepared using injection molding Table 2 discloses data of inherent viscosity for the foamed polymers and pre-foamed resins disclosed in Examples 1 and 2. Comparison of Example 1—1 and Examples 1—2 and 1—3 demonstrate that the average molecular weight and associated properties of polysulfone are not affected during the foaming process conducted at 300° C. by additional of 2% and 4% poly(propylene carbonate), respectively. Comparison of Example 3—1 and Examples 3—2 and 3—3 support the same conclusion.

TABLE 2
INHERENT VISCOSITY OF FOAMED POLYMERS OBTAINED USING POLY(ALKYLENE CARBONATES)

| Example | Polymer Foaming Agent | Wt % | Solvent | Inherent Viscosity (dl/g) |
|---|---|---|---|---|
| 1-1 | Polysulfone | 100 | Chloroform | 0.44 |
| 1-2 | Polysulfone poly(propylene carbonate) | 98 2 | Chloroform | 0.45 |
| 1-3 | Polysulfone poly(propylene carbonate) | 96 4 | Chloroform | 0.44 |
| 2-1 | Polyetherimide | 100 | Methylene Chloride | 0.37 |
| 2-2 | Polyetherimide poly(propylene carbonate) | 98 2 | Methylene Chloride | 0.39 |
| 2-3 | Polyetherimide poly(propylene carbonate) | 96 4 | Methylene Chloride | 0.38 |

Table 3 presents the results of pyrolysis of poly(propylene carbonate) according to Example 5. The results obtained by thermogravimetric analysis demonstrate that the pyrolyzate formed via pyrolysis at 300° C. and 350° C., under helium and oxygen containing atmospheres (i.e., air) results in essentially no decomposition residue. In addition, pyrolysis at 300° C. and 350° C. under helium atmosphere provides no detectable amount of propylene oxide, a decomposition product of poly(propylene carbonate), and minor amounts of water. The pyrolysis at 300° C. and 350° C. under an oxygen-containing atmosphere provided minor amounts of propylene oxide (18 ppm and 21 ppm, respectively, and slightly greater amounts of water).

TABLE 3
QUANTITATIVE ANALYSIS OF PPC PYROLYZATES AND OXIDATION PRODUCTS

| | T = 300° C. | | T = 350° C. | |
|---|---|---|---|---|
| | Pyrolysis (He) | Oxidation (air) | Pyrolysis (He) | Oxidation (air) |
| Propylene Oxide | N.D. | 18 ppm | N.D. | 21 ppm |
| Water | 106 ppm | 395 ppm | 216 ppm | 272 ppm | various other embodiments and aspects of the present invention will occur to those skilled in the art without departing from the spirit or scope of the invention. Having thus described the present invention, what is now deemed appropriate for Letters patent is set out in the following appended claims.

We claim:

1. A process for producing a foamed article from a polymer capable of being foamed which comprises:
    (a) mixing first polymer capable of being foamed is selected from the group consisting of polysulfone poly(ether sulfone), poly(aryl sulfone), poly(aryl ether sulfone), poly(etherimide), poly(amide-imide), poly(aryl ether ketone), modified poly(phenylene ether), amorphous polyamides and poly(phenylene sulfide) and copolymers and terpolymers as well as blends of the above mentioned polymers with a second polymer comprising a homopolymer or copolymer of propylene carbonate or a blend of the propylene carbonate polymer with at least one other alkylene carbonate polymer to provide a polymer blend;
    (b) heating the polymer blend to a temperature sufficient to melt the polymer to be foamed and to decompose the second polymer to form gas inclusions within the first polymer;
    (c) expanding the melted first polymer containing the gas inclusions to form a foamed article; and
    (d) cooling the foamed article to a temperature below the melting or softening point of the foamed article.

2. The process according to claim 1 wherein the first polymer capable of being foamed is poly(sulfone).

3. The process according to claim 1 wherein the first polymer capable of being foamed is polyetherimide.

4. The process according to claim 1 wherein the first polymer capable of being foamed comprises a poly(phenylene ether).

5. The process according to claim 1 wherein the second polymer has covalently linked units of the general structural formulae:

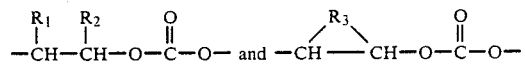

wherein $R_1$ is a hydrogen atom or a linear or branched alkyl group having from about 1 to six carbon atoms; $R_2$ is selected from H or $CH_3$; and $R_3$ is an alkylene group having from about 2 to 6 carbons atoms which may optionally contain an oxygen atom or a sulfur atom in the alkylene backbone.

6. The process according to claim 5 wherein $R_1$ is selected from methyl, ethyl, propyl, isopropyl, butyl, isobutyl, tert-butyl and the isomers of pentyl and hexyl.

7. The process according to claim 5 wherein $R_2$ is a hydrogen atom.

8. The process according to claim 6 wherein $R_2$ is methyl.

9. The process according to claim 6 wherein $R_3$ is selected from $C_2H_4$, $C_5H_{10}$, $C_6H_{12}$, $C_7H_{14}$, $C_{16}H_{32}$, $C_4H_8O$ and $C_4H_8S$.

10. The process according to claim 1 wherein the second polymer comprises poly(propylene carbonate).

11. The process according to claim 1 wherein the poly(propylene carbonate) has an average molecular weight ranging from about 1000 to 1,000,000.

12. The process according to claim 1 further comprising mixing a nucleating agent selected from talc, wollastonite, attapulgus clay, kaolin clay, calcium carbonate and citric acid into the polymer to be foamed and the second polymer comprising at least one poly(alkylene carbonate).

13. The process according to claim 1 wherein the second polymer is a blend of two or more poly(alkylene carbonates).

14. The process according to claim 1 wherein the second polymer is a copolymer formed by polymerizing carbon dioxide and two or oxirane compounds represented by the formulae:

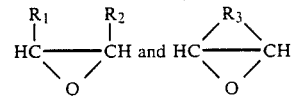

wherein $R_1$ is a hydrogen atom or linear or branched alkyl group having from about 1 to six carbon atoms; $R_2$ is selected from H or $CH_3$; and $R_3$ is an alkylene group having from about 2 to 6 carbons atoms which may optionally contain an oxygen atom or a sulfur atom in the alkylene backbone.

15. The process according to claim 14 wherein $R_1$ is selected from methyl, ethyl, propyl, isopropyl, butyl, isobutyl, tert-butyl and the isomers of pentyl or hexyl.

16. The process according to claim 14 wherein $R_2$ is selected from a hydrogen atom or a methyl group.

17. The process according to claim 14 wherein $R_3$ is selected from $C_2H_4$, $C_5H_{10}$, $C_6H_{12}$, $C_4H_8O$ or $C_4H_8S$.

18. The process according to claim 1 wherein the expanding according to step (c) comprising extruding the polymer blend containing the gas inclusions to form the foamed article.

19. The process according to claim 1 wherein the expanding according to step (c) comprises injection molding the polymer blend containing the gas inclusions to form the foamed article.

20. The process according to claim 1 wherein the expanding according to step (c) comprises compression molding the polymer containing the gas inclusions to form the formed article.

* * * * *